(12) United States Patent
Krishnan et al.

(10) Patent No.: US 7,974,038 B2
(45) Date of Patent: Jul. 5, 2011

(54) SERVO WRITER WITH RETRACT CAPACITOR FOR GENERATING A VCM DRIVING CURRENT DURING A POWER FAILURE

(75) Inventors: Puspanathan Krishnan, Taman Klang Jaya (MY); Anandan Vengadasalam, Batu Caves (MY)

(73) Assignee: Western Digital Technologies, Inc., Irvine, CA (US)

( * ) Notice: Subject to any disclaimer, the term of this patent is extended or adjusted under 35 U.S.C. 154(b) by 790 days.

(21) Appl. No.: 11/953,266

(22) Filed: Dec. 10, 2007

(65) Prior Publication Data

US 2009/0147396 A1 Jun. 11, 2009

(51) Int. Cl.
*G11B 5/54* (2006.01)
*G11B 21/12* (2006.01)

(52) U.S. Cl. ........................................................ 360/75
(58) Field of Classification Search .................. None
See application file for complete search history.

(56) References Cited

U.S. PATENT DOCUMENTS

| | | | |
|---|---|---|---|
| 5,768,045 A | 6/1998 | Patton, III et al. | |
| 5,969,899 A | 10/1999 | Utenick et al. | |
| 6,188,192 B1 | 2/2001 | Chen | |
| 6,316,898 B1 | 11/2001 | Albrecht et al. | |
| 6,396,652 B1 * | 5/2002 | Kawachi et al. | 360/75 |
| 6,567,232 B1 | 5/2003 | Klaassen | |
| 6,594,102 B1 * | 7/2003 | Kanda et al. | 360/75 |
| 6,614,614 B1 * | 9/2003 | Murayama et al. | 360/77.02 |
| 6,924,956 B2 * | 8/2005 | Kurihara | 360/75 |
| 6,937,429 B2 | 8/2005 | Yoshida et al. | |
| 6,972,921 B1 | 12/2005 | Rana et al. | |
| 6,977,791 B2 * | 12/2005 | Zhu et al. | 360/75 |
| 7,019,989 B2 | 3/2006 | Kobayashi et al. | |
| 7,068,460 B2 | 6/2006 | Brenden et al. | |
| 7,095,579 B1 * | 8/2006 | Ryan et al. | 360/75 |
| 7,116,512 B1 | 10/2006 | Rana et al. | |
| 7,206,158 B2 * | 4/2007 | Kusumoto | 360/75 |
| 2002/0167750 A1 | 11/2002 | Kurihara | |
| 2005/0264914 A1 | 12/2005 | Kusumoto | |

* cited by examiner

*Primary Examiner* — Hoa T Nguyen
*Assistant Examiner* — James L Habermehl

(57) ABSTRACT

A servo writer is disclosed for writing servo data onto a disk of a disk drive. The servo writer comprises a push-pin operable to contact an actuator arm of the disk drive, an actuator for actuating the push pin, and a retract capacitor. The retract capacitor is charged, and the actuator actuates the push-pin in order to position the head radially over the disk. If a power failure occurs while actuating the push-pin, a current is applied from the retract capacitor to a voice coil of the actuator arm in order to retract the actuator arm.

20 Claims, 5 Drawing Sheets

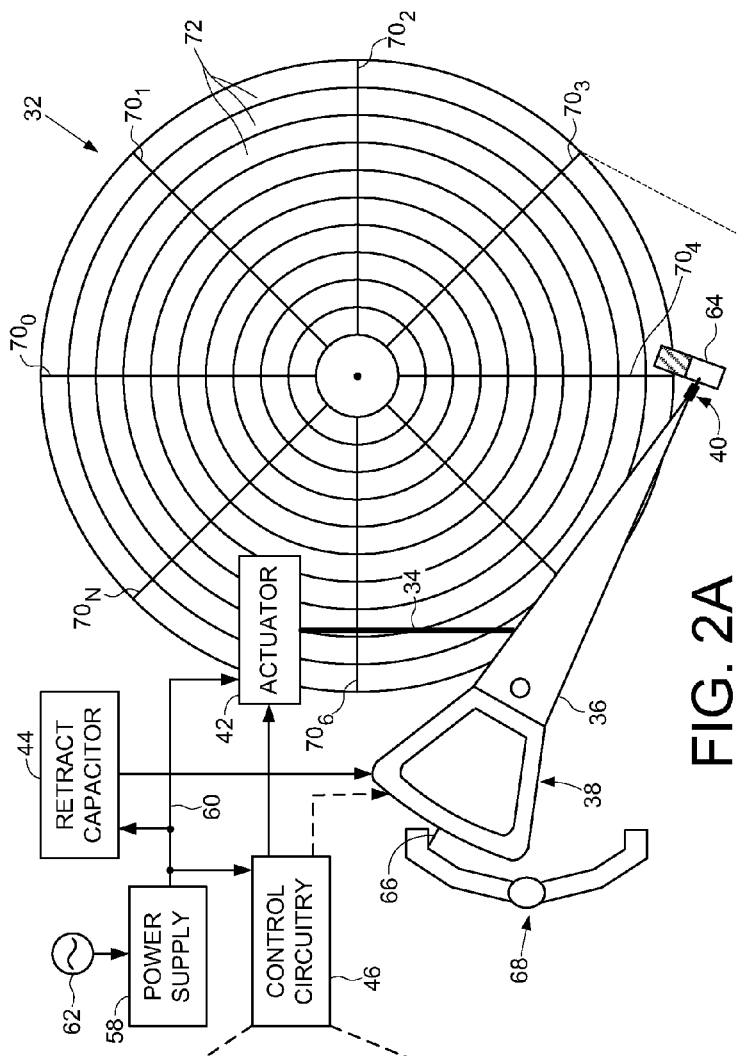
FIG. 2A
FIG. 2B
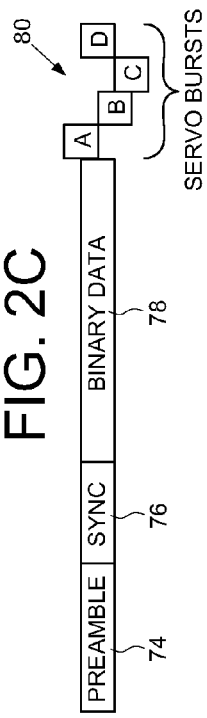
FIG. 2C

SERVO WRITER WITH RETRACT CAPACITOR FOR GENERATING A VCM DRIVING CURRENT DURING A POWER FAILURE

BACKGROUND

Disk drives comprise a disk 2 (FIG. 1) and a head 4 connected to a distal end of an actuator arm 6 which is rotated about a pivot by a voice coil motor (VCM) to position the head radially over the disk 2. The VCM comprises a voice coil 8 which when driven by a current generates a magnetic flux that interacts with the magnetic flux of permanent magnets (FIG. 5), thereby generating a torque that rotates the actuator arm 6 about the pivot. While the disk drive is powered down, the actuator arm 6 may be parked on a ramp 10 at the outer periphery of the disk 2, or the head 4 may be parked on a landing zone at the inner diameter of the disk 2. In either case, a crash stop 12 typically limits the stroke of the actuator arm 6 by contacting a tab 14 extending from the base of the actuator arm 6. The disk 2, head 4, actuator arm 6, and VCM are typically enclosed in a head disk assembly (HDA), wherein a printed circuit board (PCB) including the control circuitry for controlling operation of the disk drive is mounted to the HDA.

The disk 2 comprises a plurality of radially spaced, concentric tracks 16 for recording user data sectors and servo sectors $18_0$-$18_N$. The servo sectors $18_0$-$18_N$ comprise head positioning information (e.g., a track address) which is read by the head 4 and processed by a servo control system to control the velocity of the actuator arm 6 as it seeks from track to track. Prior to mounting the PCB to the HDA, servo writers have been employed to write the servo sectors $18_0$-$18_N$ to the disk 2, or to write seed patterns to the disk (e.g., spiral patterns) from which the servo sectors $18_0$-$18_N$ are servo written using a fill station or by the disk drive itself.

FIG. 1 shows a prior art servo writer which inserts a push-pin 20 through a hole in the HDA for contacting the actuator arm 6. The servo writer comprises an actuator 22 for actuating the push-pin 20 using precise positioning mechanics (e.g., a laser interferometer) in order to actuate the head 4 radially over the disk 2 while writing the servo sectors $18_0$-$18_N$ or seed patterns to the disk 2. Control circuitry 24 within the servo writer controls the operation of the actuator 22 and supplies the appropriate write data to the head 4 at the appropriate time. The control circuitry 24 and the actuator 22 are powered by an uninterrupted power supply (UPS) 26 which typically converts an AC supply voltage 28 into suitable DC supply voltages 30.

The servo writer is powered by the UPS 26 to prevent the head 4 from crashing into the surface of the disk 2 during a power failure. Thus, in the event of a power failure, the UPS 26 may signal the control circuitry 24 to command the actuator 22 to move the push-pin 20 and retract the actuator arm 6 (to either unload the actuator arm 6 onto the ramp 10 or park the head 4 on the landing zone). However, using a UPS 26 to protect against power failures significantly increases the cost of the servo writer.

There is, therefore, a need for a servo writer capable of retracting the actuator arm 6 in the event of a power failure without needing an expensive UPS.

BRIEF DESCRIPTION OF THE DRAWINGS

FIG. 2A shows a servo writer according to an embodiment of the present invention comprising a power supply for powering control circuitry for actuating a push-pin, and for charging a retract capacity.

FIG. 2B is a flow diagram executed by the control circuitry for powering a voice coil of the HDA with the retract capacitor to retract the actuator arm during a power failure.

FIG. 2C shows the format of an embedded servo sector written by the servo writer.

DETAILED DESCRIPTION OF EMBODIMENTS OF THE INVENTION

Figure 1:
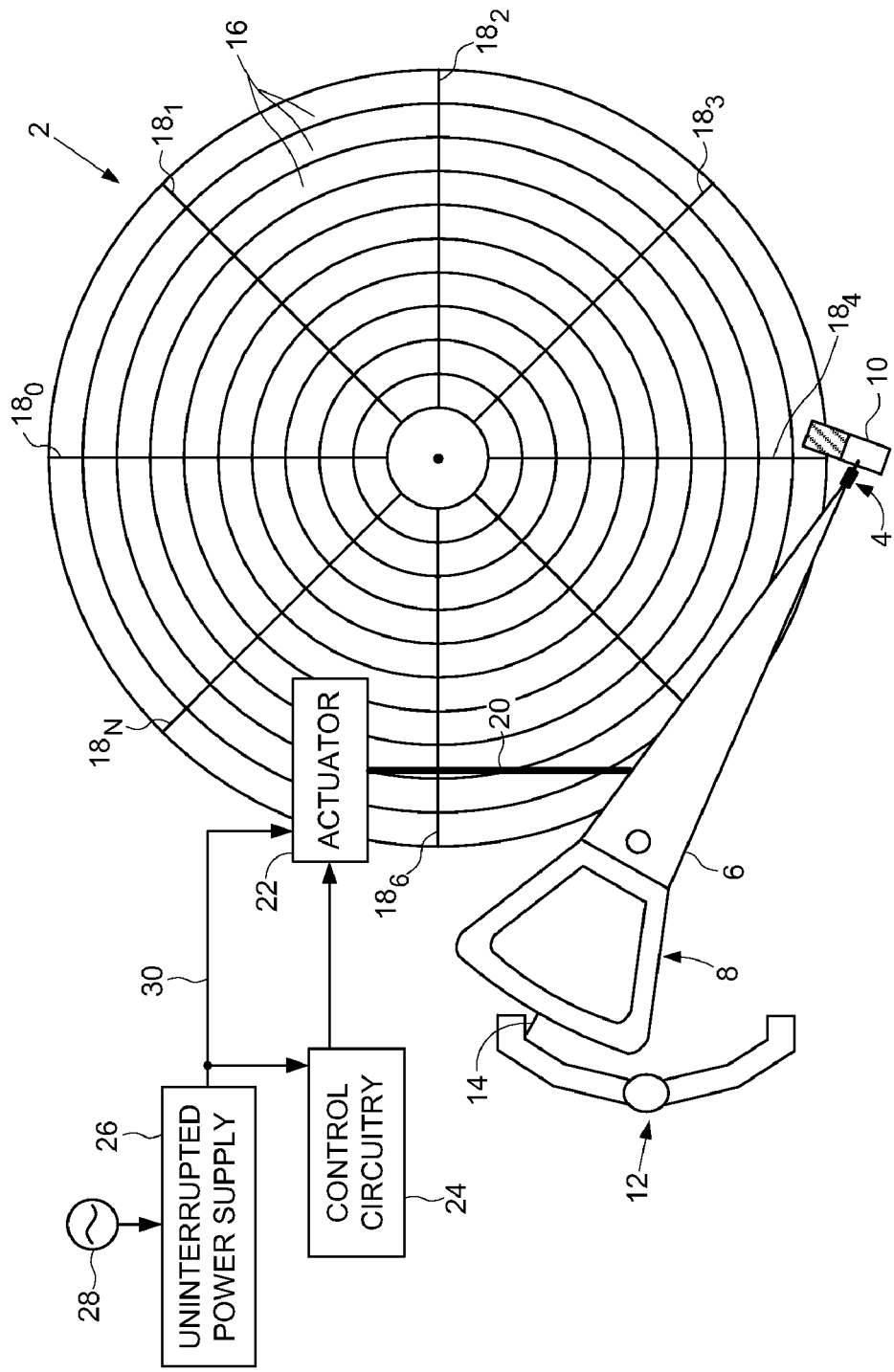
FIG. 1 shows a prior art servo writer comprising an uninterrupted power supply and a push-pin for actuating the actuator arm in the HDA of a disk drive, wherein the push-pin is used to retract the actuator arm in the event of a power failure.

FIG. 2A shows a servo writer according to an embodiment of the present invention for writing servo data onto a disk 32 of a disk drive. The servo writer comprises a push-pin 34 operable to contact an actuator arm 36 of the disk drive, wherein the actuator arm 36 comprises a voice coil 38 coupled to a base of the actuator arm 36 and a head 40 coupled to a distal end of the actuator arm 36. The servo writer further comprises an actuator 42 for actuating the push pin 34, a retract capacitor 44, and control circuitry 46 for executing the flow diagram of FIG. 2B. The retract capacitor 44 is charged (step 48), and the actuator 42 actuates the push-pin 34 in order to position the head 40 radially over the disk 32 (step 50). Servo data is written to the disk 32 (step 52), and if a power failure occurs while actuating the push-pin (step 54), a current is applied from the retract capacitor 44 to the voice coil 38 of the actuator arm 36 in order to retract the actuator arm 36 (step 56).

In the embodiment of FIG. 2A, the servo writer comprises a power supply 58 for generating suitable DC supply voltages 60 in response to an AC supply voltage 62, wherein the DC supply voltages 60 are for powering the control circuitry 46 and actuator 42, and for charging the retract capacitor 44. When a power failure occurs (when the AC supply voltage 62 is removed), the DC supply voltages 60 drop to zero such that the control circuitry 46 and actuator 42 become inoperable. However, since the disk 32 is still spinning due to momentum, an air bearing prevents the head 40 from contacting the disk 32. Before the air bearing dissipates, the retract capacitor 44 applies a current to the voice coil 38 in order to retract the actuator arm 36.

In one embodiment, the actuator arm 36 is retracted toward a ramp 64 wherein a tab extending from the distal end of the actuator arm 36 contacts and slides up the ramp 64. A tang 66 coupled to a base of the actuator arm 36 contacts a crash stop

68 once the actuator arm 36 reaches the parked position on the ramp 64. In an alternative embodiment, the actuator arm 36 is retracted toward an inner diameter of the disk 32 where the head 40 is parked in a landing zone once the disk 32 spins down and the air bearing dissipates. The actuator arm 36 is retracted until the tang 66 contacts the crash stop 68. Any suitable crash stop configuration may be employed to limit the stroke of the actuator arm 36 at the end of the retract operation.

In the embodiment of FIG. 2A, a plurality of embedded servo sectors $70_0$-$70_N$ are written around the circumference of the disk 32 to define a plurality of servo tracks 72. As shown in FIG. 2C, in one embodiment each servo sector comprises a preamble 74 for storing a periodic pattern, which allows proper gain adjustment and timing synchronization of the read signal, and a sync mark 76 for storing a special pattern used to symbol synchronize to a data field 78. The data field 78 stores coarse head positioning information, such as a track address, used to position the head 40 over a target data track during a seek operation. Each servo sector further comprises groups of servo bursts 80 (e.g., A, B, C and D bursts), which comprise a number of consecutive transitions recorded at precise intervals and offsets with respect to a servo track centerline. The groups of servo bursts 80 provide fine head position information used for centerline tracking while accessing a data track during write/read operations.

Figure 3:
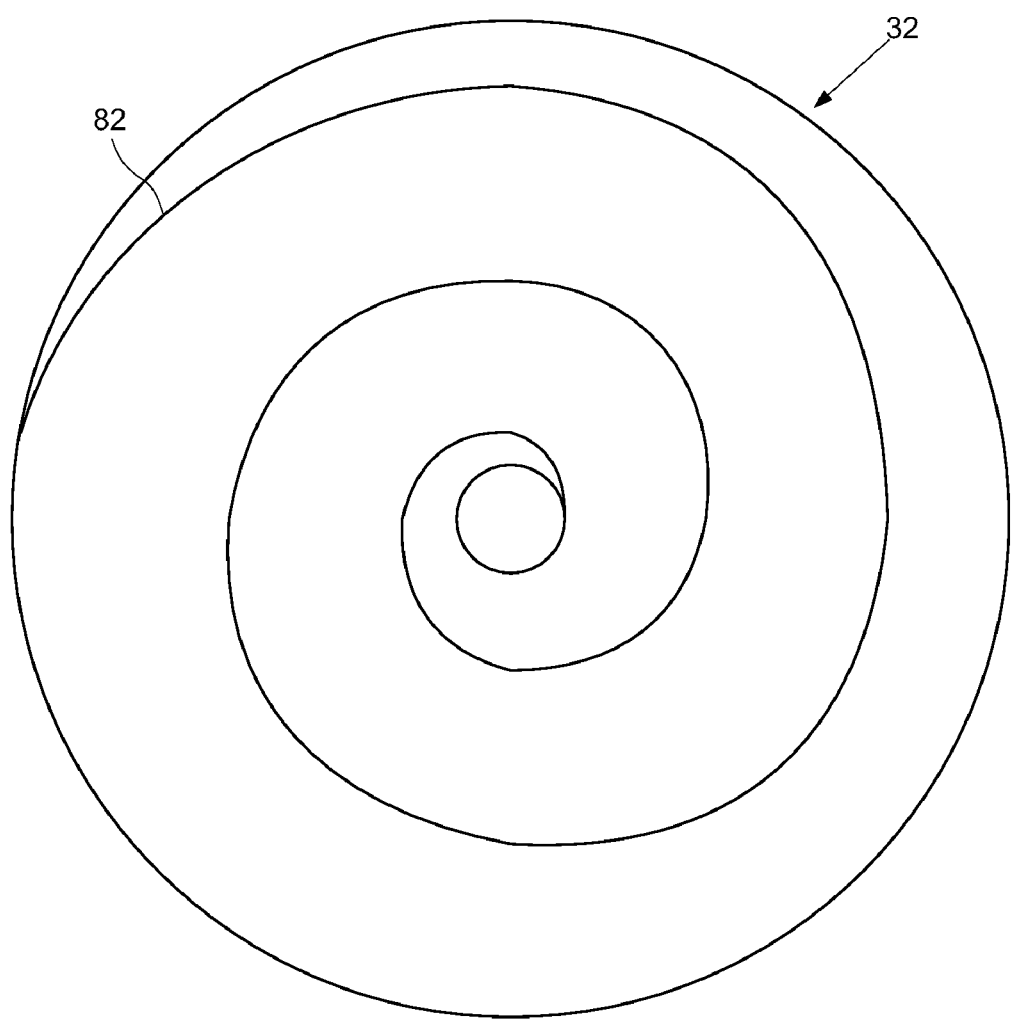
FIG. 3 shows a spiral seed pattern written by the servo writer, wherein the spiral seed pattern is used to write the embedded servo sectors (e.g., using a fill station or self-servo writing by the disk drive).

In one embodiment, the servo data written by the servo writer of FIG. 2A comprises the servo sectors $70_0$-$70_N$ which may include the format shown FIG. 2C, or any other suitable format. In an alternative embodiment, the servo writer writes a seed pattern to the disk 32, wherein the seed pattern is used to write the servo sectors $70_0$-$70_N$ to the disk 32 (e.g., using a fill station or during a self-servo writing process). FIG. 3 shows an example seed pattern as comprising a spiral track 82 written over multiple revolutions of the disk 32. When writing the servo sectors $70_0$-$70_N$, the spiral tracks provide the position information for servoing the head 40. In an alternative embodiment, the spiral tracks provide the position information for servoing the head 40 during normal operation of the disk drive.

In one embodiment, the control circuitry 46 comprises suitable circuitry (e.g., an H-bridge driver) for applying a bias current (dashed line in FIG. 2A) to the voice coil 38 in order to bias the actuator arm 36 against the push-pin 34 while the actuator 42 moves the push-pin 34. In an alternative embodiment, the push-pin 34 may be coupled to the actuator arm 36 so that it is unnecessary to bias the actuator arm 36 against the push-pin 34.

Figure 4A:
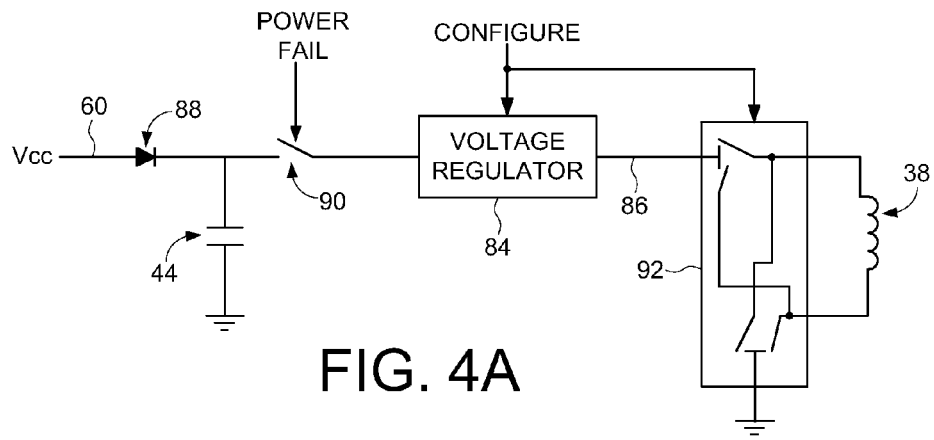
FIG. 4A shows an embodiment of the present invention comprising the retract capacitor, voltage regulator for regulating a voltage applied to the voice coil, and switches for configuring the direction of the voice coil current.

FIG. 4A shows an embodiment of the present invention wherein the servo writer comprises a voltage regulator 84 for generating a regulated voltage 86 in response to the retract capacitor 44. When the power fails, a diode 88 prevents the retract capacitor 44 from discharging through the supply line 60, and a switch 90 is closed to apply the voltage generated by the retract capacitor 44 to the voltage regulator 84. The embodiment of FIG. 4A further comprises a plurality of switches 92 for configuring a direction of the current applied to the voice coil 38 and thereby configure the retract direction of the actuator arm 36 (i.e., toward the outer or inner diameter of the disk 32).

In one embodiment, the power fail switch 90 comprises a suitable relay or a suitable transistor, such as a field effect transistor, that closes (conducts) when the power fails. The plurality of switches 92 for configuring the direction of the voice coil current may comprise programmable transistors, or in an alternative embodiment, they may comprise suitable manual switches, such as jumpers or dip switches. In either embodiment, the switches 92 may be configured based on the type of disk drive being servo written (i.e., a ramp load/unload type of disk drive, or a landing zone type of disk drive).

Figure 4B:
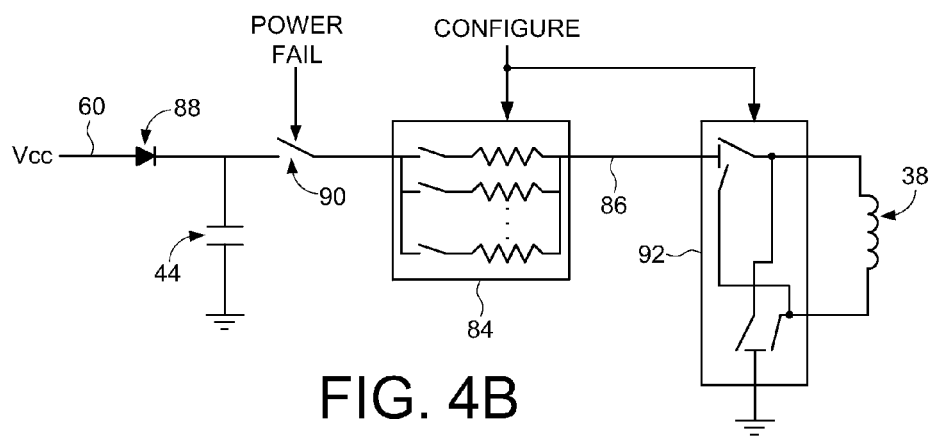
FIG. 4B shows an embodiment of the present invention wherein the voltage regulator comprises a programmable resistor in series with the voice coil.
Figure 4C:
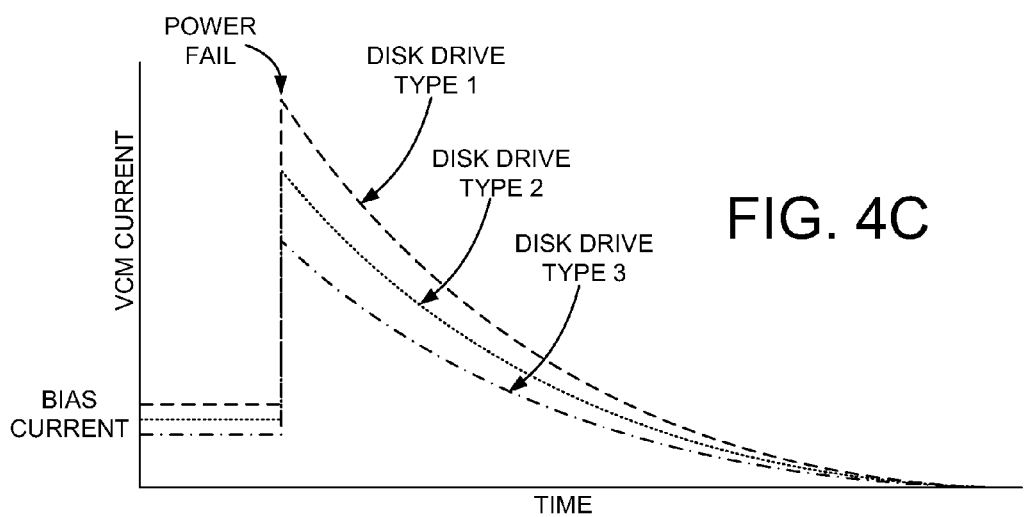
FIG. 4C shows an embodiment of the present invention wherein the maximum voice coil current generated by the retract capacitor is adjusted relative to a type of disk drive being servo written.

Any suitable voltage regulator 84 may be employed in the embodiments of the present invention. In one embodiment, the voltage regulator 84 comprises a resistor in series with the voice coil 38 as shown in FIG. 4B which generates an exponentially decaying current profile as the voltage across retract capacitor 44 decays as shown in FIG. 4C. In an alternative embodiment, the voltage regulator 84 comprises more sophisticated circuitry for generating a more sophisticated current profile for retracting the actuator arm 36. For example, the current profile may comprise an acceleration segment, a constant velocity segment, and a ramp contact segment for driving the actuator arm 36 up the ramp 64.

In the embodiment of FIG. 4B, the voltage regulator 84 comprises an adjustable resistor which may be implemented in any suitable manner, such as a plurality of resistors that may be connected in parallel using a plurality of switches. The switches may comprises programmable transistors, or manually activated switches, such as jumpers or dip switches. In one embodiment, the voltage regulator 84 is configurable (e.g., by configuring the resistor switches) to apply a maximum current to the voice coil 38 selected from a plurality of possible maximum currents. In one embodiment, the maximum current applied to the voice coil 38 is selected based on the type of disk drive being servo written, such as the number of arms or the strength of the VCM (as determined by its torque constant Kt). This embodiment is illustrated in FIG. 4C wherein the maximum current is selected based on the type of disk drive. For example, a higher maximum current may be needed for disk drives that employ a higher mass actuator arm (more arms) or a lower strength VCM. The appropriate current profile is selected to prevent damaging the head 40 when the actuator arm 36 engages the ramp 64 or reaches the final latched position. In this manner, the servo writer can be configured (electronically or manually) to servo write a number of different type of disk drives.

In one embodiment, the voltage regulator 84 is configured to increase the retract current applied to the voice coil 38 to account for the mass of the push-pin 34 and servo writer actuator 42. For example in the embodiment shown in FIG. 2A (and FIG. 5), if the actuator arm 36 is retracted toward the inner diameter of the disk 32, the voice coil 38 must be driven with enough current to move the push-pin 34 as well as the actuator arm 36. In one embodiment, the switches shown in FIG. 4B are configured to select the appropriate series resistance that will increase the retract current.

Figure 5:
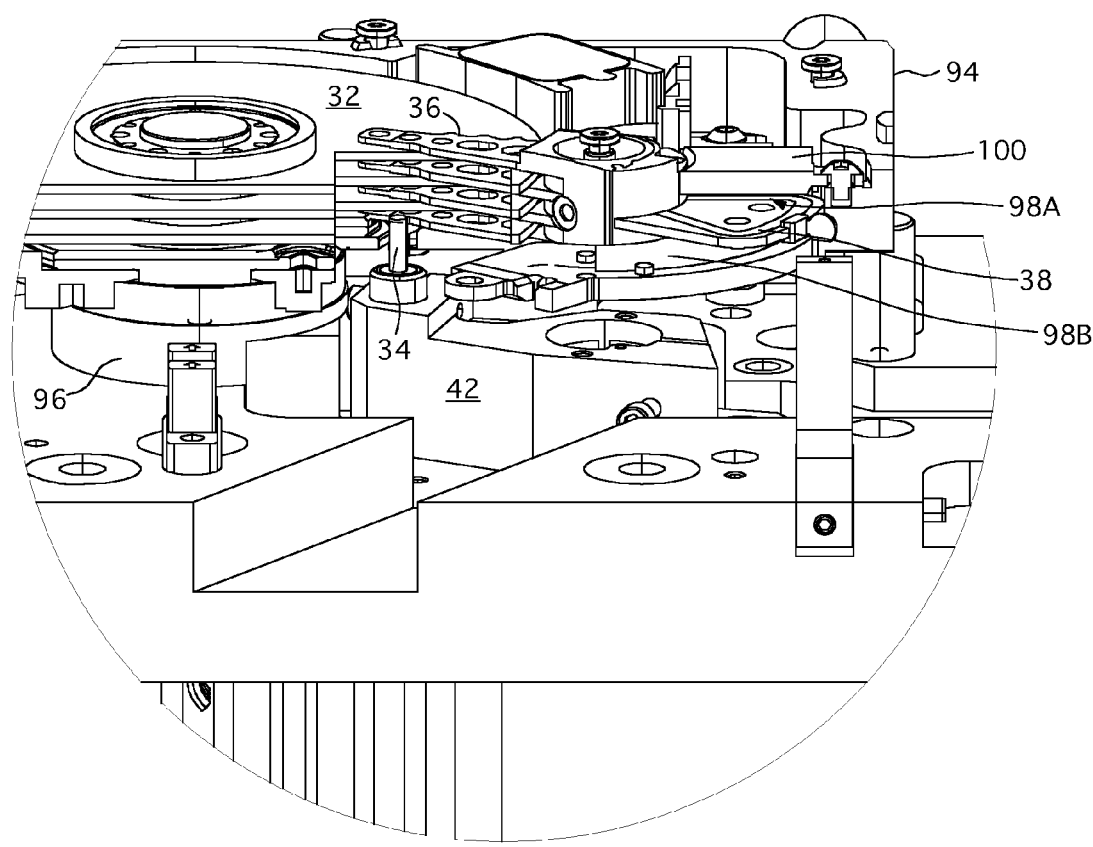
FIG. 5 shows a servo writer according to an embodiment of the present invention including a push-pin for actuating the actuator arms within the HDA of the disk drive.

FIG. 5 shows an isometric view of a servo writer according to an embodiment of the present invention. In the embodiment shown, the HDA 94 being servo written comprises three disks 32 rotated by a spindle motor 96, and four arms 36 actuated over the disks (the suspension and heads are not shown for clarity). The push pin 34 presses against a side of the actuator arm 36 in this embodiment, however in other embodiments the push pin 34 may be coupled to the actuator arm 36. Any suitable actuator 42 may be employed to actuate the push-pin 34, such as a suitable Micro-E actuator. FIG. 5 also shows the voice coil 38 coupled to the base of the actuator arm 36 which generates a magnetic flux that interacts with magnetic flux of permanent magnets 98A and 98B attached to a yoke 100 of the VCM. Any suitable VCM configuration may be employed in the embodiments of the present invention, including any suitable number of permanent magnets and/or any suitable orientation for the voice coil.

Any suitable control circuitry 46 may be employed in the embodiments of the present invention, such as the control circuitry shown in FIG. 4A and 4B. In one embodiment, the control circuitry 46 comprises a microprocessor for executing code segments of a control program. In another embodiment, the control circuitry 46 may comprise suitable state machine circuitry for controlling operation of the servo writer.

What is claimed is:

1. A servo writer for writing servo data onto a disk of a disk drive, the servo writer comprising:
    a push-pin operable to contact an actuator arm of the disk drive, wherein the actuator arm comprises a voice coil coupled to a base of the actuator arm and a head coupled to a distal end of the actuator arm;
    an actuator for actuating the push-pin;
    a retract capacitor; and
    control circuitry operable to apply a current from the retract capacitor to the voice coil in order to retract the actuator arm if a power failure occurs while actuating the push-pin;
    wherein:
        the control circuitry comprises a voltage regulator for generating a regulated voltage in response to the retract capacitor, where the regulated voltage is applied across the voice coil to generate the current applied to the voice coil;
        the voltage regulator is configurable to apply a maximum current to the voice coil selected from a plurality of possible maximum currents; and
        the maximum current is selected based on a type of disk drive being servo written.

2. The servo writer as recited in claim 1, wherein the voltage regulator comprises a resistor in series with the voice coil.

3. The servo writer as recited in claim 2, wherein the resistor is adjustable.

4. The servo writer as recited in claim 1, further comprising a manually configured switch for configuring the voltage regulator.

5. The servo writer as recited in claim 1, further comprising a plurality of switches for configuring a direction of the current applied to the voice coil, thereby configuring a retract direction of the actuator arm.

6. The servo writer as recited in claim 5, wherein the direction of the current is configured based on a type of disk drive being servo written.

7. The servo writer as recited in claim 5, wherein the switches are configured manually.

8. A method for writing servo data onto a disk of a disk drive, wherein the disk drive comprises an actuator arm including a voice coil coupled to a base of the actuator arm and a head coupled to a distal end of the actuator arm, the method comprising:
    actuating a push-pin to move the actuator arm;
    applying a current from a retract capacitor to the voice coil in order to retract the actuator arm if a power failure occurs while actuating the push-pin; and
    generating a regulated voltage in response to the retract capacitor, where the regulated voltage is applied across the voice coil to generate the current applied to the voice coil;
wherein:
    the regulated voltage is generated to apply a maximum current to the voice coil selected from a plurality of possible maximum currents; and
    the maximum current is selected based on a type of disk drive being servo written.

9. The method as recited in claim 8, further comprising adjusting a resistor to generate the regulated voltage.

10. The method as recited in claim 8, further comprising manually configuring a switch to generate the regulated voltage.

11. The method as recited in claim 8, further comprising selecting a direction of the current applied to the voice coil, thereby configuring a retract direction of the actuator arm.

12. The method as recited in claim 11, wherein the direction of the current is selected based on a type of disk drive being servo written.

13. The method as recited in claim 11, further comprising configuring switches to select the direction of the current applied to the voice coil.

14. The method as recited in claim 13, wherein the switches are manually configured.

15. A servo writer for writing servo data onto a disk of a disk drive, the servo writer comprising:
    a push-pin operable to contact an actuator arm of the disk drive, wherein the actuator arm comprises a voice coil coupled to a base of the actuator arm and a head coupled to a distal end of the actuator arm;
    an actuator for actuating the push-pin;
    a retract capacitor;
    control circuitry operable to apply a current from the retract capacitor to the voice coil in order to retract the actuator arm if a power failure occurs while actuating the push-pin; and
    a plurality of switches for configuring a direction of the current applied to the voice coil, thereby configuring a retract direction of the actuator arm.

16. The servo writer as recited in claim 15, wherein the direction of the current is configured based on a type of disk drive being servo written.

17. The servo writer as recited in claim 15, wherein the switches are configured manually.

18. A method for writing servo data onto a disk of a disk drive, wherein the disk drive comprises an actuator arm including a voice coil coupled to a base of the actuator arm and a head coupled to a distal end of the actuator arm, the method comprising:
    actuating a push-pin to move the actuator arm;
    applying a current from a retract capacitor to the voice coil in order to retract the actuator arm if a power failure occurs while actuating the push-pin; and
    selecting a direction of the current applied to the voice coil, thereby configuring a retract direction of the actuator arm.

19. The method as recited in claim 18, wherein the direction of the current is selected based on a type of disk drive being servo written.

20. The method as recited in claim 18, further comprising configuring switches to select the direction of the current applied to the voice coil.

* * * * *